US006201643B1

(12) United States Patent
Carlson

(10) Patent No.: US 6,201,643 B1
(45) Date of Patent: Mar. 13, 2001

(54) INTERNAL NATURAL LIGHT DELIVERY SYSTEM

(76) Inventor: Ronald M. Carlson, 20940 Exeter St., Kildeer, IL (US) 60047

( * ) Notice: Subject to any disclaimer, the term of this patent is extended or adjusted under 35 U.S.C. 154(b) by 0 days.

(21) Appl. No.: 09/567,340

(22) Filed: May 9, 2000

Related U.S. Application Data

(63) Continuation of application No. 08/969,237, filed on Nov. 13, 1997

(60) Provisional application No. 60/034,337, filed on Dec. 23, 1996, and provisional application No. 60/036,287, filed on Jan. 27, 1997.

(51) Int. Cl.[7] .......................... G02B 17/00; G02B 27/00; E04D 13/00; E04H 15/10

(52) U.S. Cl. .......................... 359/591; 359/597; 362/576

(58) Field of Search .................................... 359/591, 592, 359/593, 595, 599, 597; 362/147, 551, 576

(56) References Cited

U.S. PATENT DOCUMENTS

| | | | |
|---|---|---|---|
| 494,229 | 3/1893 | Lugrin | 359/597 |
| 585,770 | 7/1897 | Lugrin | 359/592 |
| 668,404 | 2/1901 | Hanneborg | 359/597 |
| 729,660 | 6/1903 | Poulson | 359/597 |
| 1,254,520 | 1/1918 | Macduff | 359/597 |
| 2,022,144 | 11/1935 | Nicolson | 353/3 |
| 3,511,559 | 5/1970 | Foster | 359/591 |
| 4,329,021 | 5/1982 | Bennett et al. | 350/259 |
| 4,349,245 | 9/1982 | Kliman | 350/264 |
| 4,389,085 | 6/1983 | Mori | 350/96.1 |
| 4,394,860 | 7/1983 | Smith | 126/439 |
| 4,593,976 | 6/1986 | Eijadi et al. | 350/260 |
| 4,761,716 | 8/1988 | Mori | 362/32 |
| 4,805,984 | 2/1989 | Cobb, Jr. | 350/96.28 |
| 5,117,811 | 6/1992 | Taylor | 126/428 |
| 5,408,795 | 4/1995 | Eljadi et al. | 52/173.3 |
| 5,988,843 * | 11/1999 | Händel | 362/576 |

FOREIGN PATENT DOCUMENTS

| | | |
|---|---|---|
| 56-24305 | 3/1981 | (JP) . |
| 58-136003 | 8/1983 | (JP) . |
| 60-53902 | 3/1985 | (JP) . |

OTHER PUBLICATIONS

Beltran, "The Design and Evaluation of Three Advanced Daylighting Systems: Light Shelves, Light Pipes and Skylights," *Lawrence Berkeley Laboratory Technical Publication No. LBL–34458*, 7 pages (Mar. 1994).

Littlefair, "Innovative daylighting: Review of systems and evaluation methods," *Lighting Res. Technol.* *22*(1):1–17 (1990).

* cited by examiner

*Primary Examiner*—Christopher E. Mahoney
(74) *Attorney, Agent, or Firm*—McAndrews, Held & Malloy

(57) ABSTRACT

An internal natural light delivery system collects light rays through a series of reflective surfaces redirects the light to an internal area of such building. The system includes a collector and a first reflector positioned adjacent a translucent structure of a building. The collected light rays are directed vertically upward by the first reflector. A first hollow member is adjacent the collector and the reflected light rays are reflected therethrough. A first elbow having a second reflector is adjacent the first hollow member. The first elbow is positioned such that the reflected light rays encounter the second reflector and are directed in a horizontal direction. A second hollow member is adjacent the first elbow and the light rays reflected by the second reflector are directed therethrough. The second hollow member extends horizontally into a desired internal space within the building. A second elbow having a third reflector is adjacent the second hollow member, and the light rays reflected through the second hollow member encounter the third reflector and is directed downward. A diffuser for dispersing the light rays into the desired internal space is adjacent the second elbow.

24 Claims, 6 Drawing Sheets

INTERNAL NATURAL LIGHT DELIVERY SYSTEM

CROSS-REFERENCE TO RELATED APPLICATIONS

This is a continuation of U.S. application Ser. No. 08/969,237 filed Nov. 13, 1997.

This application is related to and claims priority from U.S. Provisional Patent Application Serial No. 60/034,337 filed Dec. 23, 1996, and U.S. Provisional Patent Application Serial No. 60/036,287 filed Jan. 27, 1997.

STATEMENT REGARDING FEDERALLY SPONSORED RESEARCH OR DEVELOPMENT

Not applicable.

BACKGROUND OF THE INVENTION

The present system relates to the collection of visible light energy from solar radiation and the distribution of such light energy to the internal areas of a building for lumination purposes. A great variety of light transmitting systems have been proposed in this field of art. Most of the known systems typically include a light collector element mounted on the roof of a building for collecting the radiation energy and some form of light diffuser element connected to the collector element from which the light is emitted into the internal area of the building. Other systems further include some form of conductor element mounted between the collector element and diffuser element to provide an extended optical path through which the light energy may be transmitted over a particular distance.

There are a number of drawbacks associated with the lighting systems currently known in this field. Indeed, there are serious drawbacks associated with some of the more complex systems in that they are quite expensive both to purchase and install and require a good deal of ongoing maintenance. Further problems are encountered as these rooftop-mounted systems are susceptible to the adverse effects of weather.

It is therefore an object of the present invention to provide a less expensive passive lighting system having a collector element mounted adjacent a vertical translucent surface of a building for the collection of visible light energy therein.

Another object of the present invention is to provide a natural lighting system that is modular in design and hence easily adaptable to both new and existing building structures.

It is a further object of the present invention to provide a natural lighting system which is mounted entirely within the interior space of a building.

It is yet another object of the present invention to provide a natural lighting system which employs a plurality of reflectors for transmitting solar rays collected at a vertical collector element along a reflective conduit to an internally-mounted light diffusion element for the dispersion of natural light about an interior area of the building.

Other objects and advantages of the present invention will become apparent upon reference to the accompanying detailed description when taken in conjunction with the following drawings.

BRIEF SUMMARY OF THE INVENTION

The present system relates to an internal natural light delivery system designed to bring natural light into unexposed areas of an enclosed building structure. Such concept particularly lends itself to buildings having more than one floor. Because of the impracticality of penetrating horizontal floor levels above, light is intended to be gathered from a vertical and external translucent or transparent surface. The primary components of the internal natural light delivery system include:

1. a collector having a first reflector adjacent an internal surface of a translucent external structure of a building; the reflector directs light rays upward in a substantially vertical direction;
2. a first hollow member adjacent the collector such that light rays reflected upward by the first reflector are directed through the first hollow member;
3. a first elbow adjacent the first hollow member, the first elbow having a second reflector and disposed such that the light rays directed through the first hollow member encounter the second reflector and are reflected in a substantially horizontal direction;
4. a second hollow member adjacent the first elbow and disposed such that light rays reflected by the second reflector are directed through the second hollow member and into an internal area of a building;
5. a second elbow adjacent the second hollow member, the second elbow having a third reflector, the second elbow disposed such that at least a portion of light rays directed through the second hollow member is directed downward by the second reflector;
6. a diffuser adjacent the second elbow whereby at least a portion of the light rays reflected by the second reflector are dispersed into the internal space of the building.

The first hollow member is preferably substantially vertical and the second hollow member is preferably substantially horizontal. Additionally, the first hollow member and the second hollow member may have reflective internal surfaces. The first reflector of the collector may be a flat, concave or convex reflective surface. The translucent surface is preferably transparent and is more preferably a window.

The present system is also designed to be of modular construction whereby ease of installation may be accomplished even within an existing building structure. The collector and associated first hollow member may be mounted either as a free-standing unit or in secure relationship to a column of the building. The associated second hollow member and first and second elbows preferably are positioned within the plenum space of the building—a space typically reserved for mechanical/electrical structures anyway.

Another embodiment of the internal natural light delivery system includes:

1. a hollow member comprising a reflective internal surface and an open end, the open end is adjacent a translucent external structure of a building and configured such that a portion of the reflective internal surface is optically available to light rays transmitted through the translucent external structure; whereby at least a portion of the light rays is reflected through the hollow member by the internal reflective surface;

2. an elbow adjacent said hollow member comprising a reflector, said elbow disposed such that at least a portion of light rays reflected through said hollow member is directed into an internal space of said building; and
3. a diffuser adjacent the elbow whereby at least a portion of the light rays reflected by the reflector are dispersed into the internal space of the building.

The hollow member is preferably substantially horizontal, and the entire internal natural light delivery system may be located in the plenum space of the building.

DETAILED DESCRIPTION OF THE INVENTION

Figure 1:
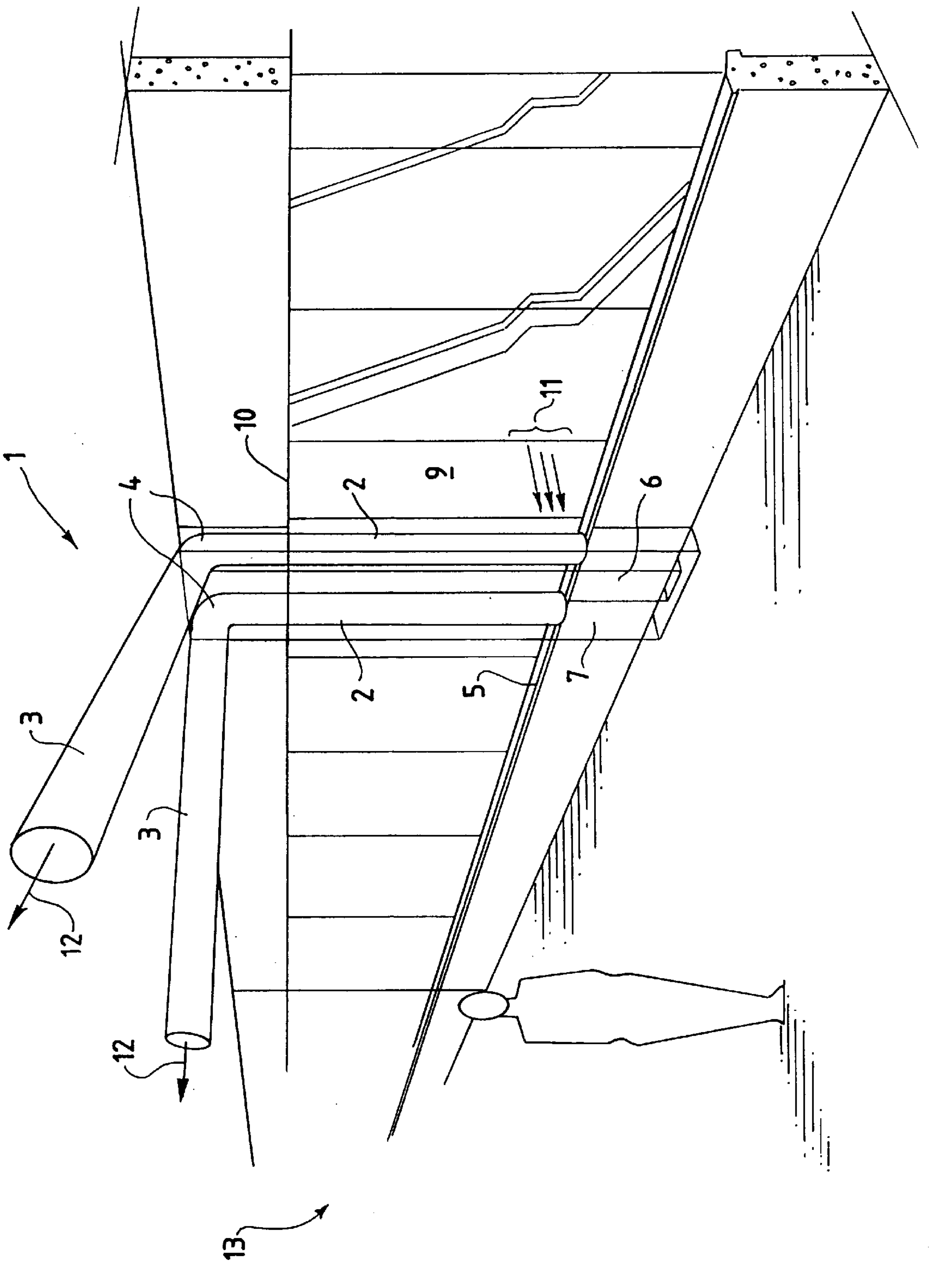
FIG. 1 is a perspective view of the internal natural light delivery system mounted within the interior of a building structure.

Turning now to FIG. 1, internal natural light delivery system 1 is shown. The system illustrated includes a hollow member 2, a second hollow member 3 and a first elbow 4 connected therebetween.

Particularly in connection with a new construction project, the first hollow member 2 may be mounted upon a window sill 5 as well as on an adjacent vertical column 6 whereby such first hollow member 2 may be concealed within the column's build-out structure 7. Such positioning places the first hollow member 2 and associated collector 8 (not shown, but see FIG. 4) in vertically-adjacent relation to the building's window 9.

First hollow member 2 extends upwardly past the ceiling level 10 of the building whereby it connects to first elbow 4. First elbow 4 then connects to second hollow member 3 which, in turn, extends a particular distance to the desired area of internal light dispersion. First hollow member 2, first elbow 4 and second hollow member 3 are all preferably constructed of an internally-reflective material to assist in the transmission of light rays 11, which pass through window 9 and into the collector (not shown in FIG. 1) along the length of these components in a direction generally indicated as 12 so as to be ultimately dispersed into the interior space 13.

It is within the contemplation of the present system that the first hollow member 2 be supported in any number of ways so as to be adjacent the window 9 for the collection of light rays 11. Options include a floor standing support system as well as a ceiling-hung version. Similarly, the present system also contemplates that the first hollow member 2 need not extend vertically downward as far as the sill 5 as the proper collection of light rays 11 may be accomplished at a level substantially higher than that which is indicated. (See FIG. 5.)

Figure 2:
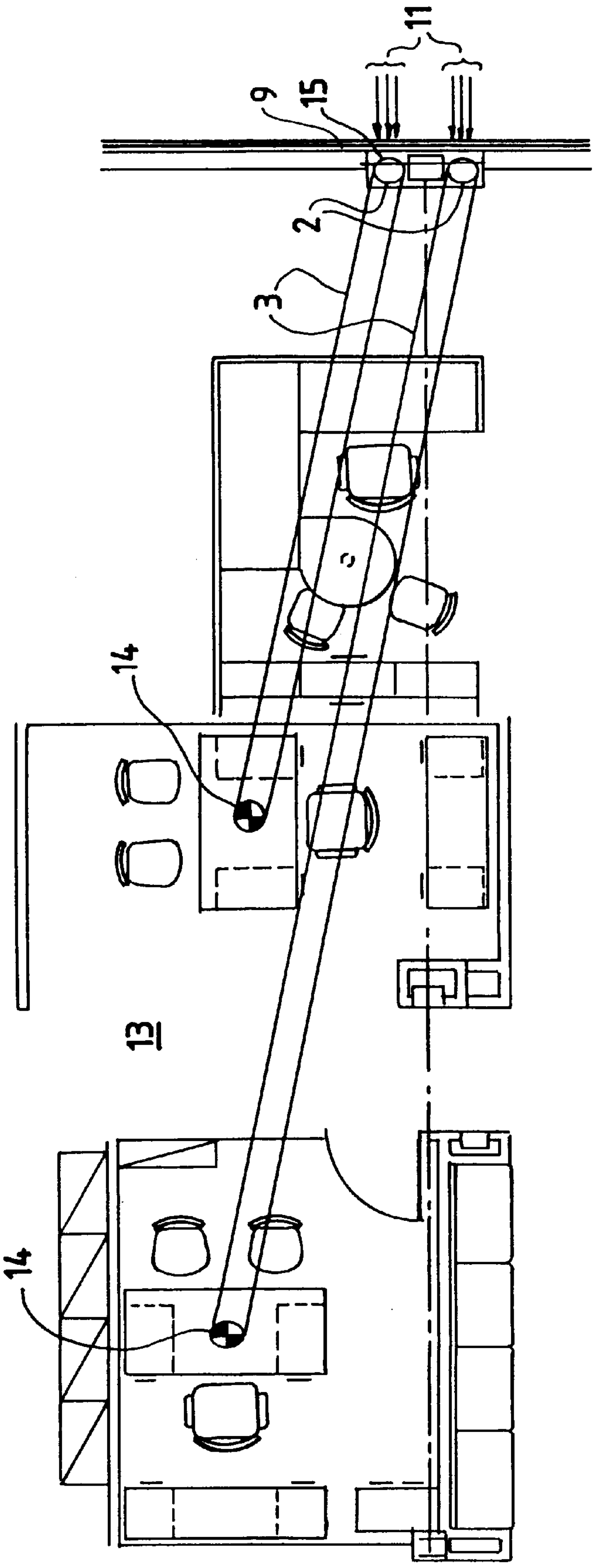
FIG. 2 is a top plan view of an internal area of a building being serviced by an internal natural light delivery system.

Referring now to FIG. 2, a top view of the system is shown whereby second hollow members 3 are shown extending a distance across an interior space 13 to second elbows 14. In practice, light rays 11 which enter this system through window 9 are reflected upwards through first hollow members 2 and across second hollow members 3 to second elbows 14.

Figure 3:
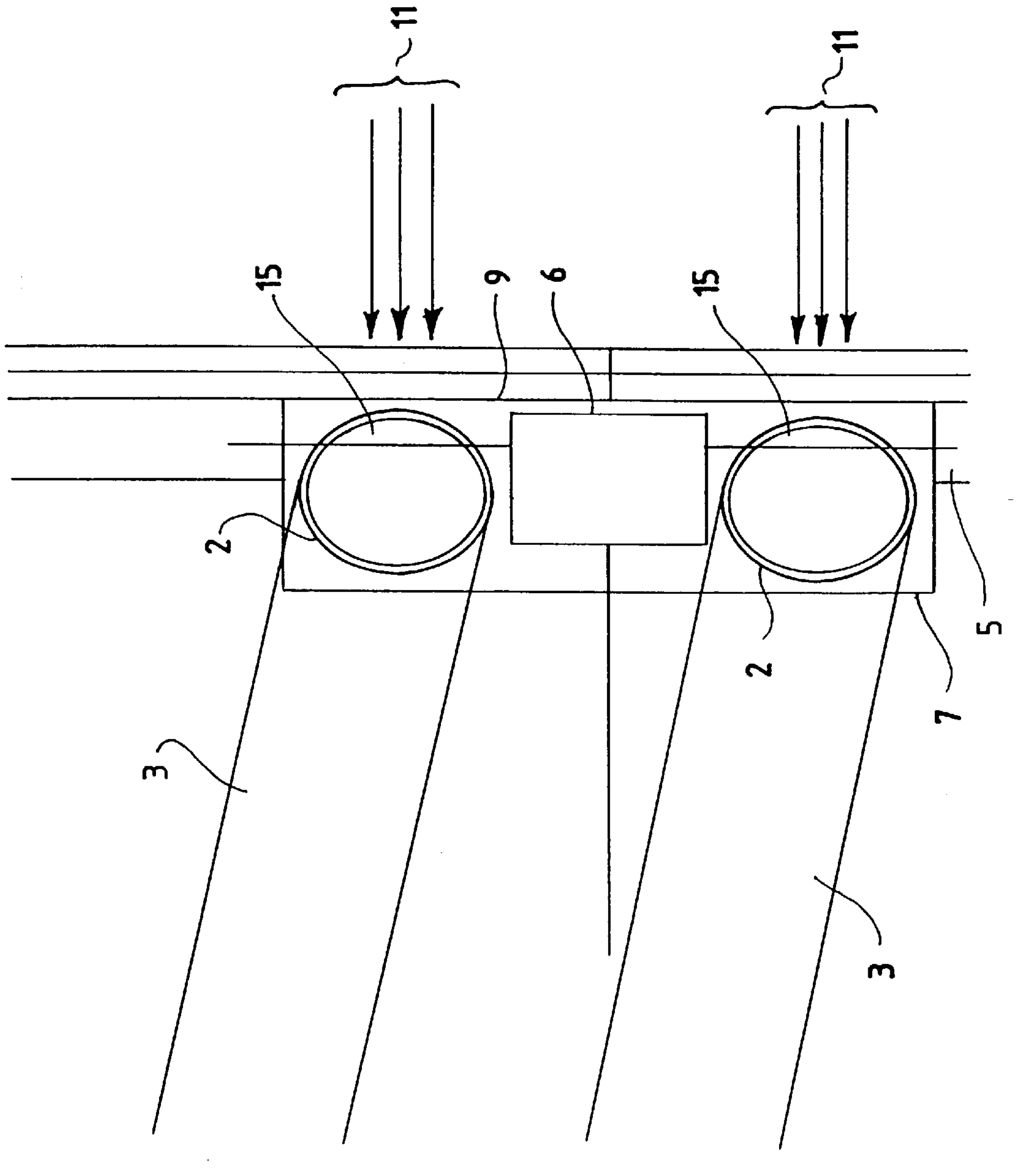
FIG. 3 is a top cross-sectional view of the collector and first hollow member of the present system mounted adjacent a vertical window.

FIG. 3 is a close-up top view of an embodiment whereby the lower end of first hollow member 2 includes an open end 15 through which light rays 11 may be received after passing through the window 9. Housed within first hollow member 2 in the area of open end 15 is a collector 8 which may be used to initiate the collection/transmission of light procedure associated with the present invention. Again, first hollow members 2 are placed upon window sill 5 and vertically adjacent to vertical column 6 of the building whereby hollow members 2 may be concealed within the column's build-out structure 7.

Figure 4:
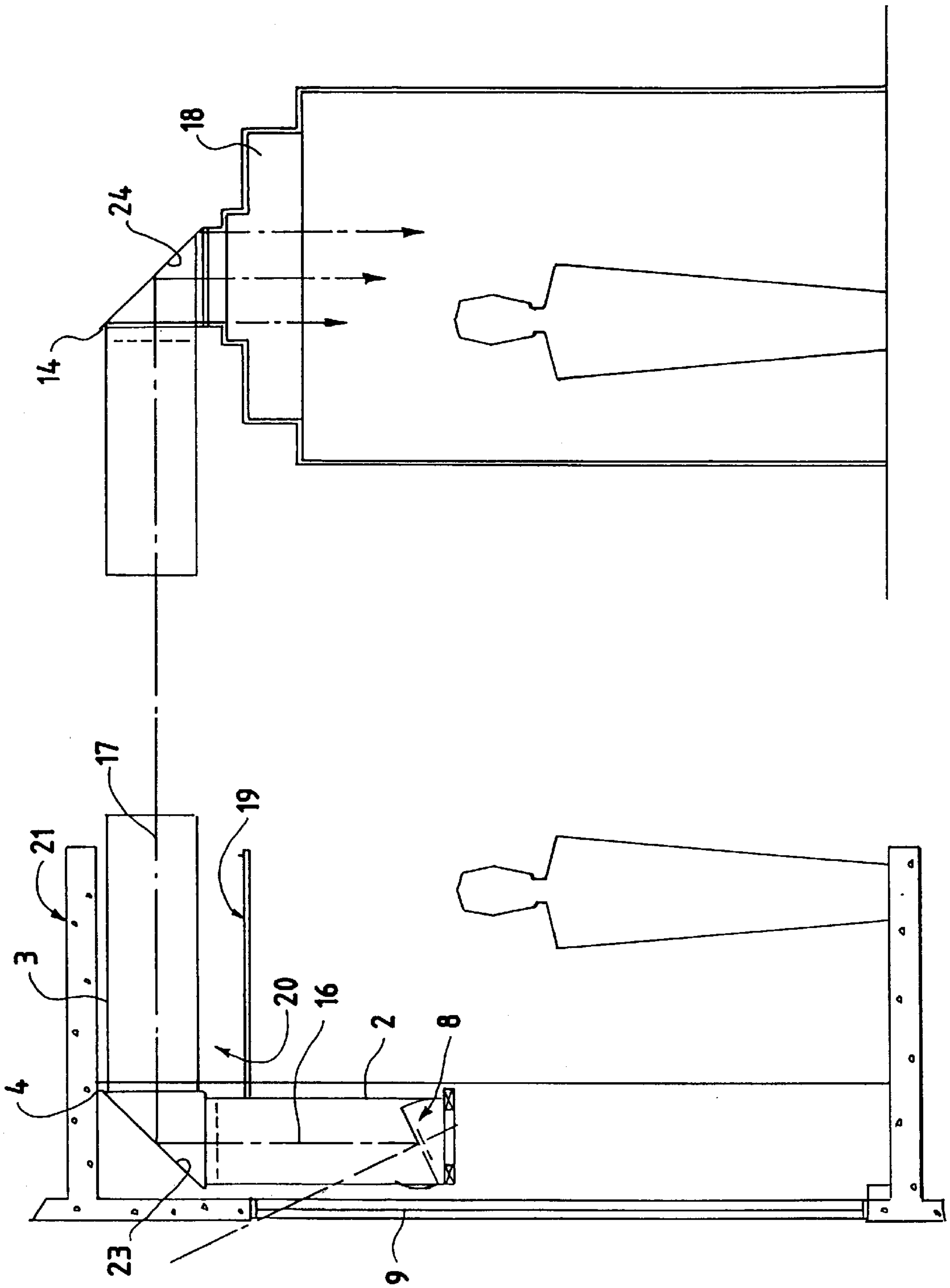
FIG. 4 is a side cross-sectional view of the internal natural light delivery system mounted within a building structure.

Looking now at FIG. 4, the position of the collector 8 is shown with respect to first hollow member 2. The reflector of collector 8 may be planar, concave or convex in shape and is manufactured of a highly reflective material.

First hollow member 2 is connected to a first elbow 4 comprising a second reflector 23 whereby the light that had been traveling along vertical path 16 with first hollow member 2 is redirected along path 17 within the second hollow member 3. Preferably, second reflector 23 comprises a planar reflective surface positioned at 90° with respect to both first hollow member 2 and second hollow member 3 to redirect the light along the prescribed path. The light travels along path 17 within second hollow member 3 whereby it encounters second elbow 14.

Second elbow 14 comprises third reflector 24 which preferably comprises a planar reflective surface as previously described for first elbow 4 to redirect the light toward the diffuser 18. Diffuser 18 which is adjacent second elbow 14 may be one of many known light dispersions fixtures which ultimately pass the reflected light into the interior space 13.

Again, the first hollow member 2 is positioned adjacent window 9. The first hollow member 2 extends upwardly through the associated ceiling 19 and into the plenum space 20 of that floor whereby it is preferably connected to a first elbow 4. First elbow 4 is further preferably connected to a second hollow member 3 whereby the light is redirected from the first hollow member 2 to the second hollow member 3. Second hollow member 3 extends a desired distance to the particular location on such floor where it is desired that the light be dispersed. At such point, second hollow member 3 is preferably connected to a second elbow 14 which redirects the reflected light to the diffuser 18. Diffuser 18 is preferably integrally mounted with the ceiling 19 much like any other light fixture, whereby it may ultimately disperse the reflected light into the interior space 13.

While the primary transmission of light is accomplished via the collector 8 and the second and third reflectors 23 and 24, each of the first hollow members 2, second hollow members 3, first elbow 4 and second elbow 14 have internal reflective surfaces to assist in the overall optical transmission of reflected light from the collector 8 to the diffuser 18. Depending upon the configuration of the plenum space 20 of a particular floor (the space defined between ceiling 19 and floor 21), it may be necessary to include additional elbows between first elbow 4 and second elbow 14 in order to direct the light toward the desired location of dispersion. It is also within contemplation of the present system that the first and second elbows 4 and 14 and second hollow member 3 be mounted below the ceiling 19 when circumstances do not permit the mounting of such components within the plenum space 20. Additionally, while the components of the preferred embodiment have been shown with a substantially circular cross section, other cross-sectional shapes may be used to successfully accomplish the aforementioned transmission of light.

Figure 5:
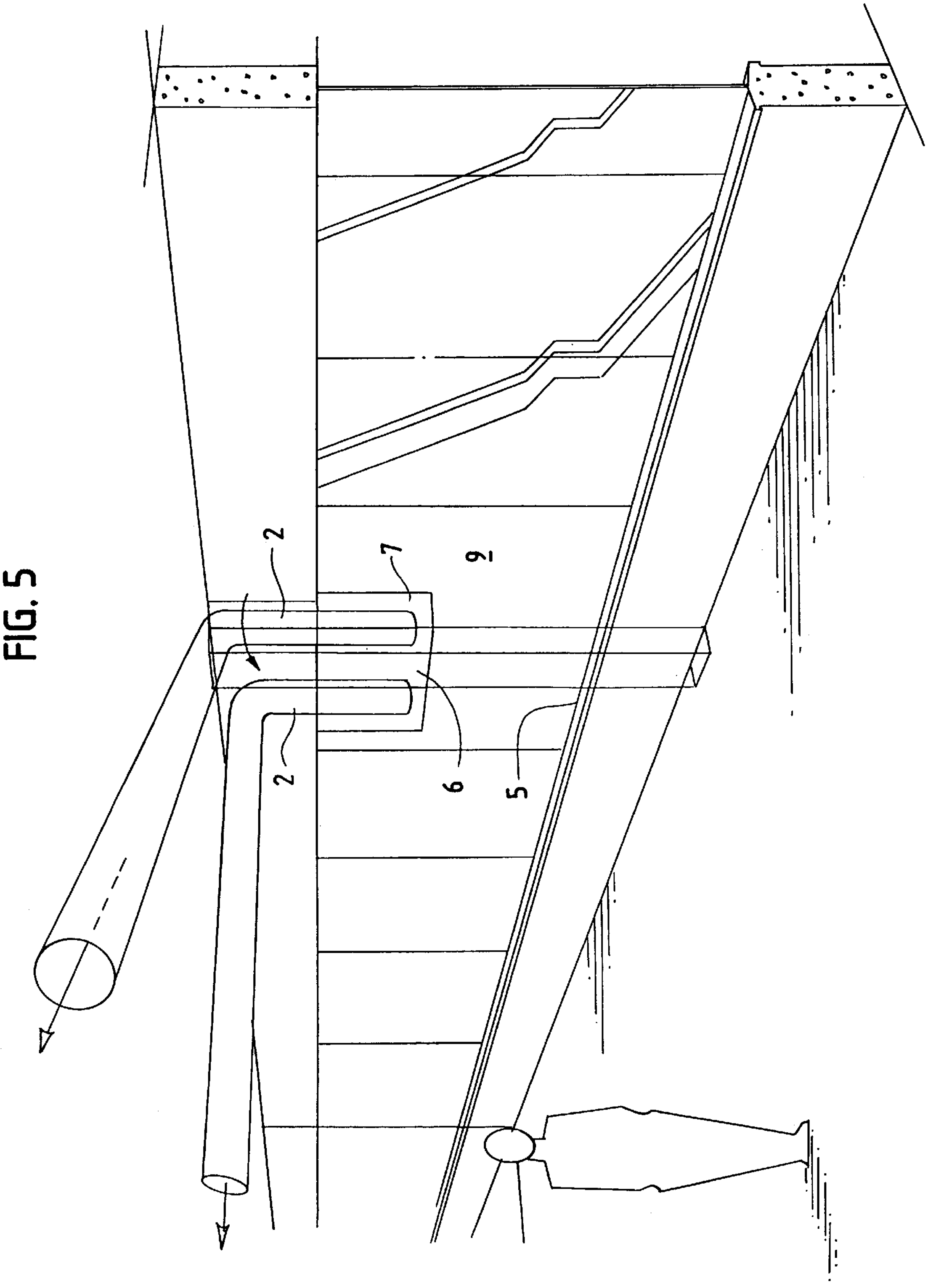
FIG. 5 is a perspective view of an alternative mounting configuration of the internal natural light delivery system of FIG. 1.

Turning now to FIG. 5, there illustrated is an alternative mounting configuration of the internal natural light delivery system of the present invention. First hollow members 2 are mounted adjacent window 9 well above window sill 5. First hollow members 2 are adjacent column 6 and are enclosed in build-out structure 7. The operation of the system of FIG. 5 is substantially identical to that discussed above with reference to FIG. 1.

Figure 6:
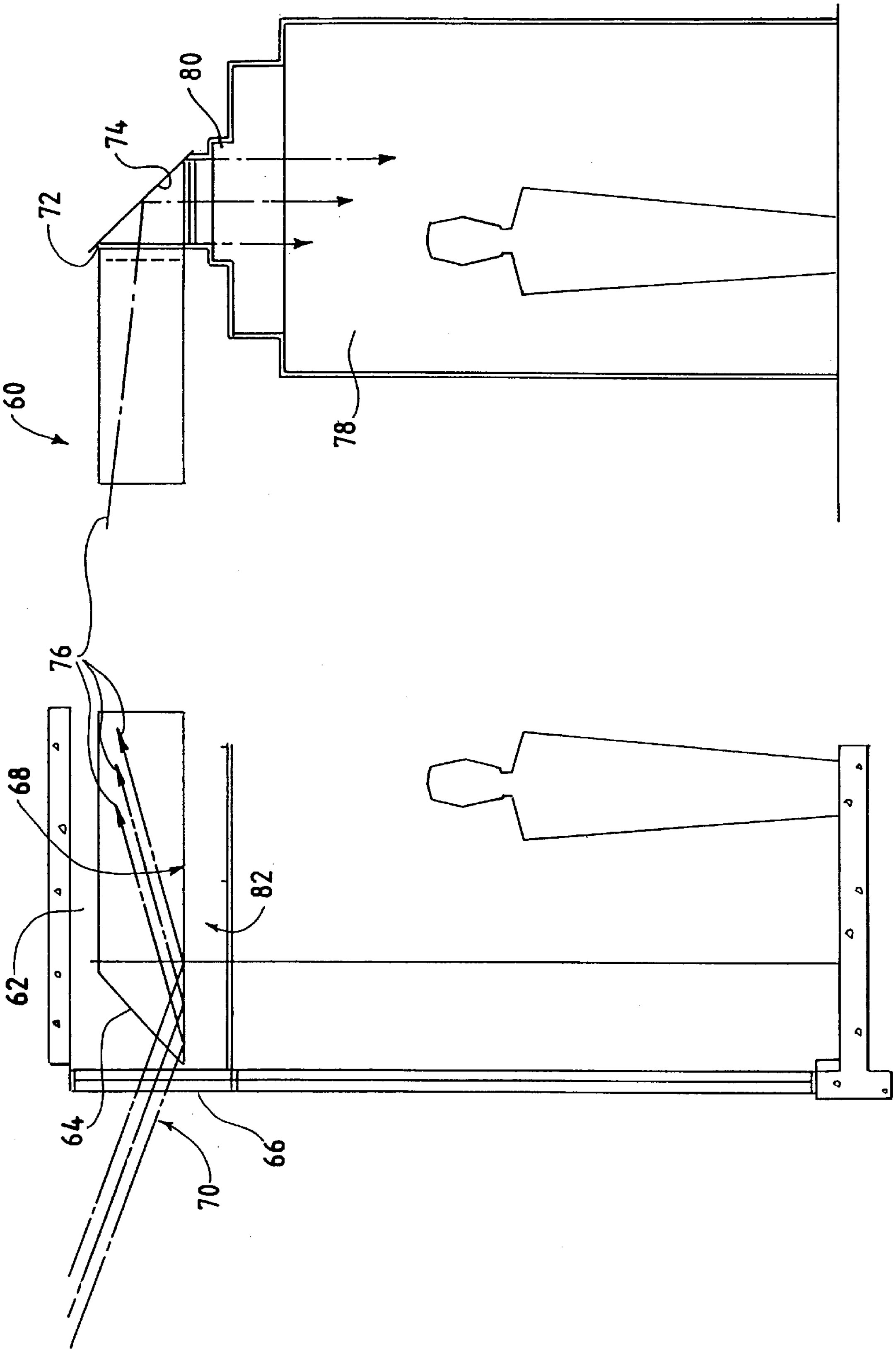
FIG. 6 is a cross-sectional view of another embodiment of the internal natural light delivery system.

Turning next to FIG. 6, illustrated there is another embodiment of internal natural light delivery system 60 of the present invention. In FIG. 6, hollow member 62 having open end 64 is disposed adjacent translucent structure 66. Hollow member 62 has internal reflective surface 68. Open end 64 is configured such that a portion of internal reflective surface 68 is optically available to light rays 70 transmitted through translucent structure 66. Light rays 70 are reflectively transmitted through hollow member 62 to elbow 72 by internal reflective surface 68. Elbow 72 comprises reflector 74 and is disposed such that the reflected light rays 76 directed through hollow member 62 are directed into interior space 78. Diffuser 80 adjacent elbow 72 disperses reflected light rays 76 into internal space 78. As illustrated in FIG. 6, the natural light delivery system 60 may be disposed entirely within the plenum space 82 when plenum space 82 is enclosed by translucent structure 66 as, for example, in a building that has a translucent glass outer surface for the windows and encasing the various plenum spaces. Alternatively, natural light delivery system 60 may be disposed generally within an internal space of the building.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An internal natural light delivery system comprising:

a collector disposed adjacent an internal surface of a translucent external structure of a building, said collector comprising a first reflector for reflecting light rays upward in a vertical direction;

a first hollow member, said collector disposed inside said first hollow member, said collector and said first hollow member disposed inside said building, and said first hollow member positioned such that at least a portion of light rays reflected by said first reflector are directed through said first hollow member;

a first elbow adjacent said first hollow member, said first elbow having a second reflector disposed therein, said first elbow positioned such that at least a portion of said light rays directed through said first hollow member encounter said second reflector and are reflected in a horizontal direction;

a second hollow member adjacent said first elbow, said second hollow member positioned such that light rays reflected by said second reflector are directed through said second hollow member into an internal space within said building;

a second elbow adjacent said second hollow member, said second elbow having a third reflector disposed therein, said second elbow positioned such that at least a portion of said light rays directed through said second hollow member encounter said third reflector and are directed downward; and a diffuser adjacent said second elbow for dispersing said light rays into said internal space.

2. The internal natural light delivery system of claim 1 wherein said first hollow member comprises a reflective internal surface.

3. The internal natural light delivery system of claim 1 wherein said second hollow member comprises a reflective internal surface.

4. The internal natural light delivery system of claim 1 wherein said first elbow comprises a reflective internal surface.

5. The internal natural light delivery system of claim 1 wherein said second elbow comprises a reflective internal surface.

6. The internal natural light delivery system of claim 1 wherein said second reflector comprises a first planar reflective surface.

7. The internal natural light delivery system of claim 6 wherein said third reflector comprises a second planar reflective surface.

8. The internal natural light delivery system of claim 1 wherein said first hollow member is tubular.

9. The internal natural light delivery system of claim 1 wherein said second hollow member is tubular.

10. The internal natural light delivery system of claim 1 wherein said first hollow member is vertical.

11. The internal natural light delivery system of claim 1 wherein said second hollow member is mounted horizontally.

12. The internal natural light delivery system of claim 1 wherein said first reflector is concave.

13. The internal natural light delivery system of claim 1 wherein said first reflector is convex.

14. The internal natural light delivery system of claim 1 wherein said first reflector is planar.

15. The internal natural light delivery system of claim 1 wherein said translucent external structure is transparent.

16. The internal natural light delivery system of claim 1 wherein said translucent external structure is a window.

17. The internal natural light delivery system of claim 1 wherein said collector is mounted on a window sill in said building.

18. The internal natural light delivery system of claim 1 wherein said first elbow, said second hollow member, and said second elbow are mounted within a plenum space of said building.

19. The internal natural light delivery system of claim 1 wherein said collector and said first hollow member are mounted adjacent a column of said building.

20. The internal natural light delivery system of claim 19 wherein said collector and said first hollow member are encased by a structural portion inside said building, said structural portion also encasing said column.

21. An internal natural light delivery system comprising:

a hollow member comprising a reflective internal surface and an open end, said open end disposed adjacent an internal surface of a translucent external structure of a building and configured such that a portion of said reflective internal surface is optically available to light rays transmitted through said translucent external surface; whereby at least a portion of said light rays is reflected through said hollow member by said internal reflective surface;

a collector disposed inside said hollow member wherein said collector and said hollow member are inside said building; and an elbow adjacent said hollow member comprising a reflector, said elbow disposed such that at least a portion of light rays reflected through said hollow member is directed into an internal space of said building.

22. The internal natural light delivery system of claim 21 further comprising a diffuser disposed adjacent said elbow, said diffuser dispersing said light rays into said internal space.

23. The internal natural light delivery system of claim 21 wherein said translucent external structure is a window.

24. The internal natural light delivery system of claim 21 wherein said hollow member and said elbow are disposed in a plenum space of said building.

* * * * *